Dec. 7, 1965    J. V. HEMMERLE, JR    3,221,605
THERMAL CHANGE COMPENSATION MECHANISM
Filed Feb. 4, 1963
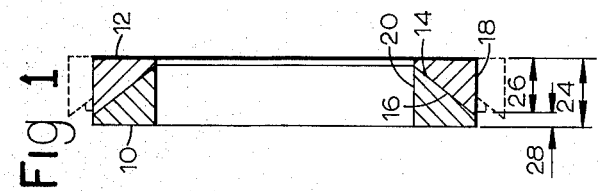
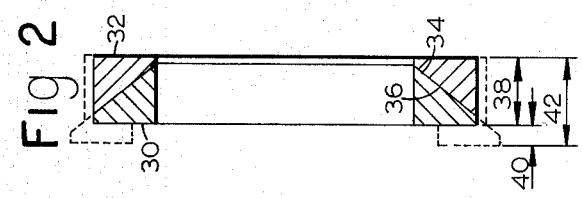
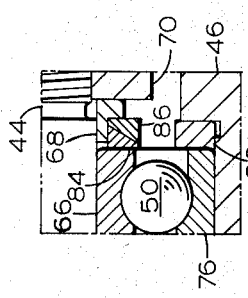
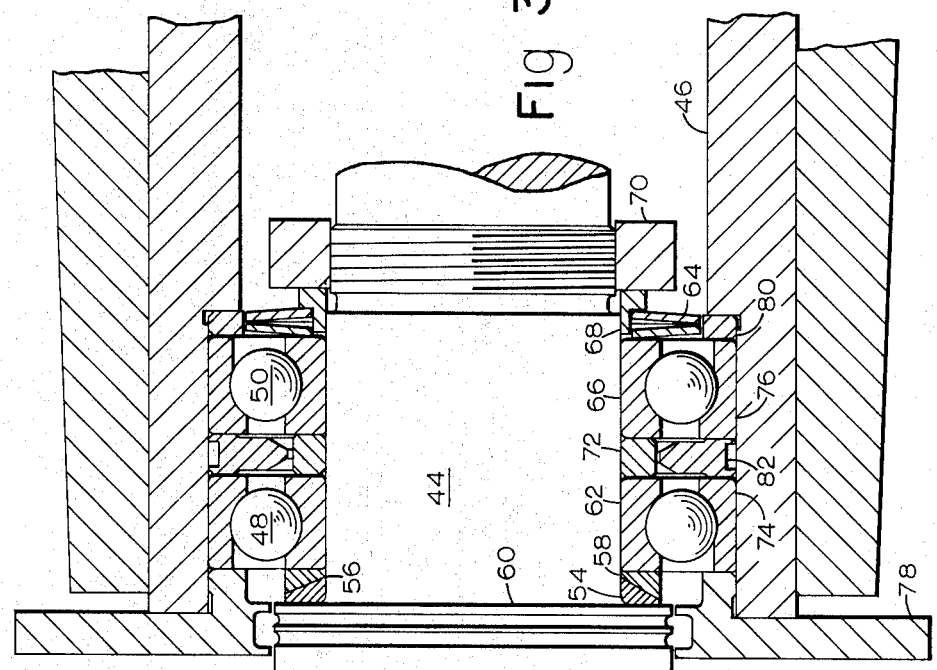
INVENTOR
JOSEPH V. HEMMERLE, JR.
BY
ATTORNEYS

United States Patent Office 3,221,605
Patented Dec. 7, 1965

3,221,605
THERMAL CHANGE COMPENSATION
MECHANISM
Joseph V. Hemmerle, Jr., Cincinnati, Ohio, assignor to
The Cincinnati Milling Machine Co., Cincinnati, Ohio,
a corporation of Ohio
Filed Feb. 4, 1963, Ser. No. 255,806
5 Claims. (Cl. 90—11)

This invention relates to a thermal change compensation mechanism and is particularly useful in combination with a machine tool spindle to maintain the end thereof at a location to compensate for temperature changes in the machine members and cutting tool during operation of the machine tool.

In the operation of a machine such as a numerically controlled milling machine, the edge of cutting tool which is held in the end of a rotating spindle is located at a known position relative to a reference position to which the machine commands are also related. During the operation of the machine, the temperature of the spindle as well as the tool temperature generally increases due to heat generated in the bearings thereof and at the cutting tool. Since the spindle together with the cutting tool form a relatively long member, the change in the axial dimensions thereof occuring as a result of the heat, expressed as a result in terms of a coefficient of expansion which is a unit length change per degree of temperature change, is of considerable effect during the operation of the machine and there must be compensation for it during machine use or design tolerances of the workpieces machined will not be satisfactorily held. Various schemes have been worked out heretofore to accomplish this sort of compensation but these are unduly complex, not universally applicable and expensive in most instances to make them not totally successful.

It is therefore an object of this invention to provide a temperature change compensation unit which will automatically adjust a linear dimension thereof inversely as the heat energy level therein changes.

It is a further object of this invention to provide a temperature compensation unit in which the normal thermal expansion of a member can be amplified in one direction.

It is also an object of this invention to provide a machine tool spindle construction which automatically will maintain an end of the spindle at a location relative to a reference member to compensate for temperature changes and in which the temperature responsive elements directly produce the spindle corrective movement which occurs as gradually as the temperature changes.

An object of this invention to provide a simple and inexpensive spindle construction providing for thermal compensation but which is highly effective in performing its intended function.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form, this invention utilizes two annular members having unequal coefficients of expansion whereby each changes its radial dimension by a predetermined amount differing from the rate of radial dimension change of the other. The two members are received against one another at complementary inclined side faces where one member extends obliquely into the other member. Since the two members change radially at different rates, the two will relatively slip along the inclined side faces. As the slippage occurs, the combined axial thickness, that is the sum of the thicknesses of the two members together measured in the direction of the axis therethrough about which the members are developed, changes. By one selection of relative coefficients of expansion the axial thickness can be made to decrease. By the reverse selection of materials an axial dimension increase can be obtained which is greater than that obtainable by a member of equal axial thickness but comprised of only the one material of the two having the greater rate of thermal change.

A clear understanding of the construction and operation of this invention can be obtained from the following detailed description in which reference is made to the attached drawings wherein:

FIG. 1 is a cross section of an annular spacer unit.

FIG. 2 is across section of an annular spacer unit of an alternate construction.

FIG. 3 is a sectional view of a machine tool spindle mechanism.

FIG. 4 is a partial view of the spindle section of FIG. 3 shownng an alternate construction.

A spacer unit is shown in FIG. 1 and it is comprised of two annular members 10, 12 which are of different materials having dissimilar coefficients of expansion. Each of the members 10, 12 has an inclined side face 14, 16, respectively which extends between the outside diameter 18 and the inside diameter 20 of each. The two side faces 14, 16 are smooth and complimentary so as to be in substantial contact therearound. The side face 14 extends obliquely into the member 12 at an angle relative to the axis about which the members 10, 12 are developed. The material of the member 10 is chosen to have a coefficient of expansion which is a fraction of that of the other member 12. The member 10 may, for example, be steel, while the member 12 is bronze which has a coefficient of expansion approximately three times that of the steel member 10. In the state shown, the two members 10, 12 can be described as having a combined axial thickness equal to the dimension 24. Assume that the temperature of the two members 10, 12 is raised. The relative expansion of the members 10, 12 is indicated by the broken lines, shown exaggerated for illustration. It can be seen that the member 12 has expanded radially about three times the amount that the member 10 has expanded radially. With the members 10, 12 stil in contact at their inclined side faces 14, 16, the two mmebers have relatively slipped along those faces and the member 10 has concurrently shifted into the member 12 axially so that their combined axial thickness is now indicated by the dimension 26 and is less than the original dimension 24 by an amount 28. In FIG. 1, the axial expansion of the members 10, 12 has been disregarded since the high ratio of radius of the members 10, 12 to their thickness will result in a radial dimension change far more significant than the axial expansion factor and the net result is a decrease in the combined axial thickness of the members 10, 12 as described. The reverse relative movements of the members 10, 12 along their side faces 14, 16 occurs when the temperature of the members is lowered to produce a net increase in their combined axial thickness. Thus the combined thickness of the members 10, 12 is inversely related to the temperature changes.

The spacer unit in FIG. 2 shows an alternate construction in which an amplified expansion in the axial direction is obtained to provide a change in combined thickness directly proportional to the temperature change of a pair of members 30, 32 which comprise the unit. The members 30, 32 each have an inclined side face 34, 36, respectively, and these are complimentary and in contact with one another. In this case, however, the member 30 which extends into the member 32 has the greater rate of radial change per temperature change. Consequently, the members 30, 32 when heated will expand and shift to positions as indicated by the broken lines, again exaggerated, and the original combined axial thickness 38 will be increased by an amount 40 to a new size 42. In this case the heat expansion of the members 30, 32 will add a slight amount to the increase due to the relative movement along the faces 34, 36. Thus the dimension 40 will be slightly greater than the dimension 28, FIG. 1, if the two members 30, 32 are exactly the same size and shape as the members 10, 12 respectively but with a reversal of relative coefficients of expansion. Increase or decrease of combined axial thickness in the units of FIGS. 1 and 2 can be adjusted by a change in the inclination of the side faces or by use of different materials having different coefficients of expansion.

A machine tool spindle mechanism is shown in section in FIG. 3 with the application of the spacer unit as shown in FIG. 1 and described. A spindle 44 extending through a spindle carrier 46 is rotatable in a set of bearings 48, 50. The spindle 44 is adapted to receive and hold a cutting tool (not shown) in its end 52 in a well known manner. In order to assure a uniform cutting operation, the position of the end 52 must be adjusted relative to the carrier 46 as the temperature changes occur. Therefore the spacer unit, comprised of the rings 54, 56 which are in contact around their complimentary inclined side faces 58, is placed between a shoulder 60 on the spindle 44 and the inner race 62 of the bearing 48. The rings 54, 56 have the same relative coefficients of expansion as do the rings 10, 12 of FIG. 1 in which the rate of radial expansion differs between the two so that the combined axial thickness of the two decreases with a temperature increase.

In order that the shoulder 60 be held in contact with the outer side of the ring 54, there is an axial force produced and acting on the spindle 44 so as to tend to move the spindle 44 toward the right, as viewed in FIG. 3, at all times. This force is produced by a set of spring washers 64 which are compressed between the inner race 66 of the bearing 50 and a retaining bushing 68 by a nut 70 which is threadedly engaged on the spindle 44 and turned tightly against the bushing 68. The inner race 66 bears against a spacer 72 which is received between the inner races 62, 66. The outer races 74, 76 are fixed in the spindle carrier 46 between a cover plate 78 and a spacer 80 with a slightly resilient spacer 82 received therebetween. The bearings 48, 50 are then relatively fixed for rotation at one location in the spindle carrier 46 and the force from the spring washers 64 will produce a shift of the spindle 44 through the bearings as the spacer rings 54, 56 charge their combined axial thickness. The spacer unit rings 54, 56 change their combined axial thickness inversely as their temperature and the temperature of the spindle 44 and bearings 48, 50 increase. The linear dimensions of the spindle 44 increase as these temperatures increase. Therefore by the slight relative shift of spindle 44 through the bearings 48, 50 due to the bias force from the spring washers 64, the spindle position is adjusted in the spindle carrier 46 to compensate for dimension changes which occur by reason of thermal changes.

In FIG. 4, an alternate construction is shown in which the spring washers 64 are replaced by a set of spacer rings 84, 86 like those described earlier herein in regard to FIG. 2 in which the combined axial thickness changes directly as the temperatures in the spindle 44 and bearings 48, 50 change. These spacers 84, 86 are received in compression between the inner race 66 and the bushing 68. Thus, for example, as the temperature increases, the rings 84, 86 force the spindle 44 toward the right as before and the shoulder 60 is maintained in contact with the ring 54. Therefore the action of the spindle 44 again is to adjust its end 52 to compensate for thermally produced dimension changes. In either of the embodiments of FIG. 3 and 4, the cooling of the spindle 44 and bearings 48, 50 results in an increase in the combined thickness of the rings 54, 56 and they force the spindle 44 back toward the left against the force of the washers 64 or into the space created by the spacer rings 84, 86 which decrease in combined thickness as they cool.

What is claimed is:

1. In a machine tool having a spindle carrier and a spindle supported for rotation on an axis therein, said spindle subject to temperature changes producing axial dimension changes thereof, a thermally adjusted spacer mechanism to compensate for the axial spindle dimension changes comprising:
    (a) means defining a shoulder around said spindle,
    (b) a locating member received in the spindle carrier at a fixed location therein, the spindle axially movable relative to said locating member,
    (c) a first annular member received around said spindle between said shoulder and locating member and having
        (1) a side face inclined relative to the axial direction of the spindle and
        (2) a predetermined rate of radial dimension change when the temperature thereof changes,
    (d) a second annular member received around said spindle between said shoulder and locating member and having
        (1) a side face complimentary to and received against said first annular member side face, said first member side face extending obliquely into said second member and
        (2) a predetermined rate of radial dimenesion change when the temperature thereof changes greater than said first annular member rate whereby said annular members relatively slip at said inclined side faces thereof to alter the combined axial thickness of said annular members inversely as the axial spindle dimensions change, and
    (e) means to produce an axial force on said spindle tending to move said shoulder and locating member together, said shoulder and locating member separated by said annular members therebetween.

2. The mechanism of claim 1 wherein:
    (a) a pair of spaced annular bearings are received around said spindle each having an inner rotatable race and a fixed outer race,
    (b) said locating member is the inner race of one of said bearings, and
    (c) said force producing means is received between said spindle and the inner race of said other bearing.

3. The mechanism of claim 2 wherein:
    (a) a nut is threadedly engaged on said spindle and spaced from the inner race of said other bearing and
    (b) said force producing means is a set of spring washers compressed between said nut and the inner race of said other bearing.

4. The mechanism of claim 2 wherein:
    (a) said force producing means is a second set of annular members received against the inner race of said other bearing and
        (1) one member of said second set has a side face inclined relative to the axial direction of said spindle and a predetermined rate of radial dimension change when the temperature thereof changes and
        (2) the other member of said second set has a rate of radial dimension change when the temperature thereof changes less than said predetermined rate of said one second set member and a side face complimentary to the side face of said one second set member, the inclined side face of said one second set member extending obliquely into said other second set member, the combined axial thickness of said second set members changing inversely as the combined axial thickness of said first and second annular members changes in response to temepature changes.

5. A thermally compensating spacer unit comprising:
(a) a first annular member having
   (1) a side face inclined between the inner and outer diameters thereof and
   (2) a predetermined rate of radial dimension change when the temperature thereof changes,
(b) a second annular member having
   (1) a side face complementary to and received against said first member inclined side face, said first member inclined side face extending obliquely into said second member from the outer diameter of said second member and
   (2) a predetermined rate of radial dimension change when the temperature thereof changes greater than said first member rate whereby the combined axial thickness of said members decreases in response to a rise in temperature.

References Cited by the Examiner

UNITED STATES PATENTS 2,180,136  11/1939  Bates _____ 308—189 X

WILLIAM W. DYER, JR., *Primary Examiner.*